US007857482B2

(12) United States Patent
Reo et al.

(10) Patent No.: US 7,857,482 B2
(45) Date of Patent: Dec. 28, 2010

(54) LINEAR LIGHTING APPARATUS WITH INCREASED LIGHT-TRANSMISSION EFFICIENCY

(75) Inventors: Ann Reo, Wilmette, IL (US); Graeme Watt, Altrincham (GB)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 11/605,576

(22) Filed: Nov. 29, 2006

(65) Prior Publication Data

US 2007/0076427 A1 Apr. 5, 2007

Related U.S. Application Data

(63) Continuation-in-part of application No. 11/026,219, filed on Dec. 30, 2004, now Pat. No. 7,159,997.

(51) Int. Cl.
*B60Q 1/026* (2006.01)

(52) U.S. Cl. .................. 362/225; 362/249.02; 362/656

(58) Field of Classification Search ................ 362/227, 362/244, 252, 217, 222, 223, 224, 800, 235, 362/240, 217.01, 217.02, 217.4, 219, 221–225, 362/249.01, 249.02, 249.04, 249.06, 276, 362/277, 278, 326, 328, 335, 355, 455, 652, 362/656, 802, 806, 812; 40/541, 542, 558; 313/498–500
See application file for complete search history.

(56) References Cited

U.S. PATENT DOCUMENTS 5,418,384 A 5/1995 Yamana et al.
6,320,182 B1 * 11/2001 Hubble et al. ............... 250/216
6,357,904 B1 3/2002 Kawashima
6,361,186 B1 * 3/2002 Slayden ...................... 362/249
6,367,948 B2 4/2002 Branson
6,426,807 B1 7/2002 Kawai et al.
6,509,840 B2 1/2003 Martineau
6,561,690 B2 5/2003 Balestriero et al.
6,592,238 B2 * 7/2003 Cleaver et al. .............. 362/246
6,601,970 B2 8/2003 Ueda et al.
6,612,717 B2 9/2003 Yen
6,641,284 B2 11/2003 Stopa et al.
6,676,284 B1 1/2004 Willson
6,761,472 B1 7/2004 Cleaver
6,767,111 B1 7/2004 Lai
6,776,504 B2 8/2004 Sloan et al.
6,940,659 B2 9/2005 McLean et al.
7,101,056 B2 9/2006 Pare
7,159,997 B2 1/2007 Reo et al.
7,213,941 B2 * 5/2007 Sloan et al. ................. 362/246

(Continued)

*Primary Examiner*—Hargobind S Sawhney
(74) *Attorney, Agent, or Firm*—King & Spalding

(57) ABSTRACT

The present invention provides for a linear lighting apparatus. The apparatus includes a plurality of light emitting diodes, a primary optical assembly, and a secondary optical assembly. The light emitting diodes produce light towards the primary optical assembly. The primary optical assembly refracts this light towards the secondary optical assembly. The secondary optical assembly receives this light and refracts the light again so that the light emanates from the linear lighting apparatus. The present invention also provides a method for improving lighting efficiency from a linear lighting apparatus. The method includes emitting light from a plurality of light emitting diodes, refracting the light in a primary optical assembly, receiving this light refracted by the primary optical assembly, and refracting this light in a secondary optical assembly so as to direct the light from the apparatus.

27 Claims, 7 Drawing Sheets

U.S. PATENT DOCUMENTS

| | | | | |
|---|---|---|---|---|
| 7,273,299 | B2 * | 9/2007 | Parkyn et al. | 362/244 |
| 7,572,027 | B2 * | 8/2009 | Zampini et al. | 362/225 |
| 2002/0093832 | A1 | 7/2002 | Hamilton | |
| 2003/0048641 | A1 | 3/2003 | Alexanderson et al. | |
| 2003/0081419 | A1 | 5/2003 | Jacob | |
| 2003/0174517 | A1 | 9/2003 | Kiraly | |
| 2003/0223235 | A1 | 12/2003 | Mohacsi et al. | |
| 2004/0076004 | A1 | 4/2004 | Smith | |
| 2004/0114355 | A1 | 6/2004 | Rizkin et al. | |
| 2004/0161213 | A1 | 8/2004 | Lee | |
| 2004/0201980 | A1 | 10/2004 | Fischer et al. | |
| 2006/0146531 | A1 * | 7/2006 | Reo et al. | 362/244 |
| 2008/0030981 | A1 * | 2/2008 | Mrakovich et al. | 362/219 |

* cited by examiner

LINEAR LIGHTING APPARATUS WITH INCREASED LIGHT-TRANSMISSION EFFICIENCY

RELATED APPLICATIONS

This application is a continuation-in-part of U.S. patent application Ser. No. 11/026,219 (the "'219 application"), entitled "Linear Lighting Apparatus with Increased Light-Transmission Efficiency," naming Ann Reo and Graeme Watt as inventors and filed Dec. 30, 2004 now U.S. Pat. No. 7,159,997. The disclosure of the '219 application, including the specification and all figures, is incorporated by reference herein in its entirety.

FEDERALLY SPONSORED RESEARCH OR DEVELOPMENT

Not applicable.

BACKGROUND OF THE INVENTION

The present invention generally relates to linear lighting apparatuses. More specifically, the present invention describes an apparatus and method for increased lighting efficiency in a linear lighting apparatus with a plurality of optical assemblies.

Many linear lighting apparatuses exist in the lighting industry today. Several of these apparatuses use light-emitting diodes ("LEDs") as light sources. LEDs are individual point light sources that each deliver a singular beam of light. When organized in a linear array, the individual beam patterns from each LED are very apparent, resulting in a "scalloping" effect. Eliminating this effect when grazing building facades or glass, for example, is highly desirable. Currently, the only light source that can deliver this continuous, uninterrupted beam of light is fluorescent light sources. However, LEDs are preferred as light sources over fluorescent lights as LEDs can produce a more concentrated beam of light at nadir while consuming less energy than fluorescent lights.

Current linear lighting apparatuses attempt to remedy the scalloping effect of LEDs light sources. However, these lighting apparatuses typically use very inefficient materials and designs for transmitting the light produced by the LEDs. For example, many of the current lighting apparatuses use reflective materials or a singular refractive material in order to direct the LED light from the apparatus.

The use of a reflective material is a very inefficient manner in which to harness and direct light emitted by LEDs. Specifically, the use of reflective materials is very difficult to control the direction of emitted light in very tight spaces. In addition, reflective materials lose a considerable amount of light emitted from the LEDs in trying to reflect the light in a given direction.

The use of refractory materials does provide a higher lighting efficiency than the use of reflective materials, but is far from optimized in current apparatuses and methods. Specifically, current lighting apparatuses employing a refractive material use a singular refractive optical assembly to direct light emitted by LEDs. The use of a singular refractive assembly does not optimize the amount of light harnessed by the assembly and emitted by the apparatus. For example, a substantial portion of light emitted by an LED may not enter into and be refracted by the single optical assembly. The light that does not enter into the optical assembly is therefore lost.

In addition, current linear lighting apparatuses provide a physical gap between an LED and a refractive optical assembly to allow for dissipation of the heat generated by the LED. However, this physical gap allows for a considerable amount of light emitted by the LED avoid being refracted by the optical assembly. Therefore, current linear lighting apparatuses are inefficient in their transmission of light from a light source to the atmosphere around the lighting apparatus.

Increased lighting efficiency is desired for linear lighting apparatuses due to their use in both indoor and outdoor applications. For example, current linear lighting apparatuses may be used to light a billboard or a facade of a building. Such an outdoor application requires considerable luminous flux from a lighting apparatus. In order to increase the amount of light (or luminous flux) output by an apparatus, the number of LEDs in the apparatus or the light-transmission efficiency of the apparatus must be increased. However, as described above, each LED produces a considerable amount of heat. Increasing the number of LEDs in an apparatus only adds to the amount of heat present in the apparatus. This increased heat can drastically shorten the lifespan of the lighting apparatus.

In addition, increased lighting efficiency is desired for linear lighting apparatuses due to their use in tight, or small architectural details. For example, many linear lighting apparatuses are placed along a narrow opening along a building facade. Due to space constraints, the lighting apparatuses must be small in size, or profile. However, as described above, the luminous flux output of the apparatuses must be considerable. Therefore, a need exists for a linear lighting apparatus that can fit in small locations and still produce considerable luminous flux. In order to meet this need the light efficiency of the linear lighting apparatus must be increased.

Therefore, a need exists to increase the light-transmission efficiency of a linear lighting apparatus without increasing the amount of heat generated. Such an apparatus preferably would provide for a significant increase in the light-transmission efficiency of a linear lighting apparatus without adding to the number of LEDs used to produce a given amount of light. By increasing the light-transmission efficiency of a linear lighting apparatus without adding to the number of LEDs, an improved linear lighting apparatus may produce an equivalent or greater amount of light as current linear lighting apparatuses without producing additional heat.

BRIEF SUMMARY OF THE INVENTION

The present invention provides for a linear lighting apparatus. The apparatus includes a plurality of light emitting diodes, a primary optical assembly, and a secondary optical assembly. The light emitting diodes produce light towards the primary optical assembly. The primary optical assembly refracts this light towards the secondary optical assembly. The secondary optical assembly receives this light and refracts the light again so that the light emanates from the linear lighting apparatus.

The present invention also provides a method for improving lighting efficiency from a linear lighting apparatus. The method includes emitting light from a plurality of light emitting diodes, refracting the light in a primary optical assembly, receiving this light refracted by the primary optical assembly, and refracting this light in a secondary optical assembly so as to direct the light from the apparatus.

The present invention also provides a lighting apparatus with increased lighting efficiency. The apparatus includes a plurality of point light sources each producing light and first and second refractory material layers refracting the light so as to produce a linear light beam emitted by the apparatus. The first refractory material layer is in physical contact with the light sources.

Figure 1:
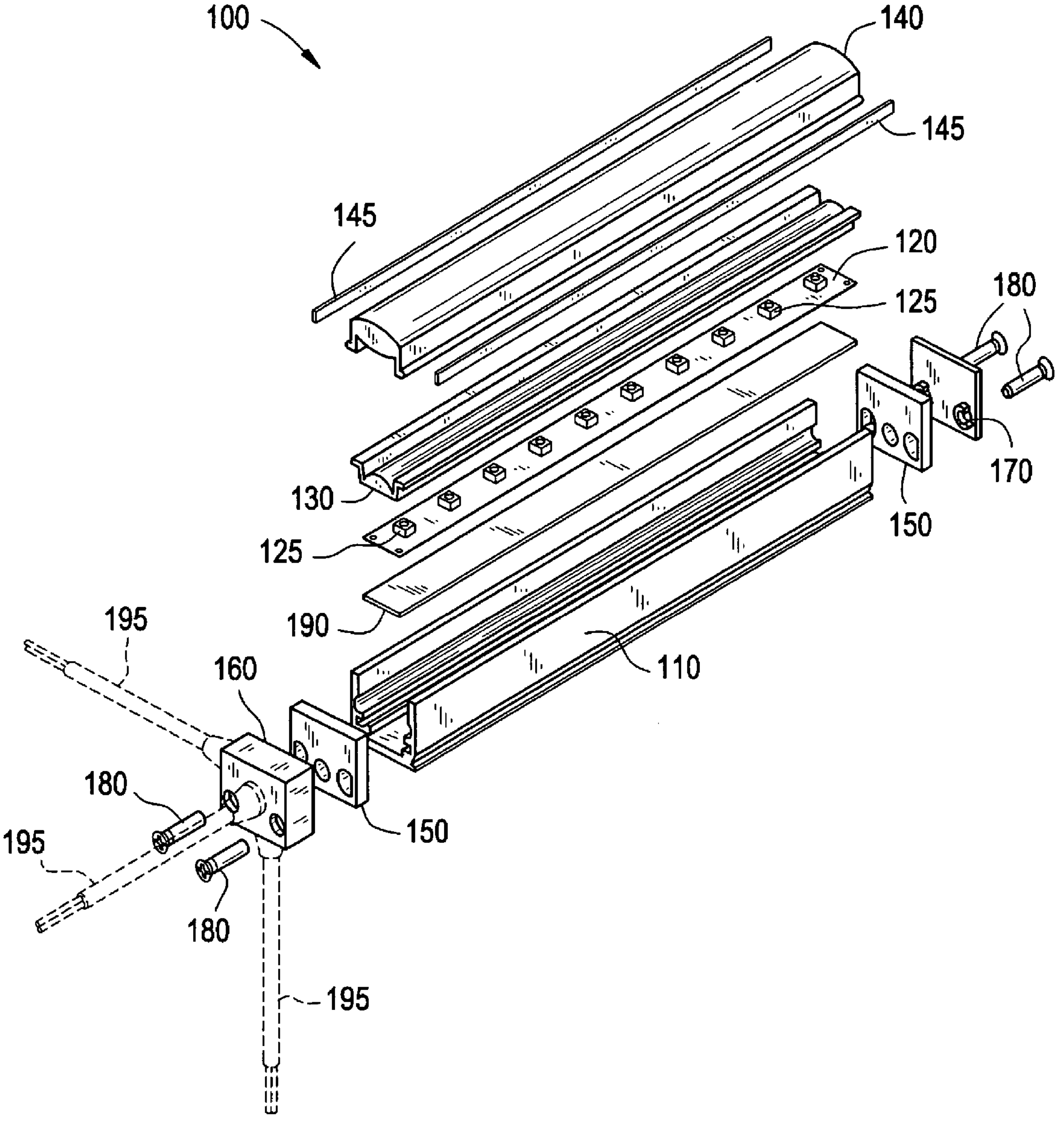
FIG. 1 illustrates an exploded perspective view of a linear lighting apparatus in accordance with an embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

FIG. 1 illustrates an exploded perspective view of a linear lighting apparatus 100 in accordance with an embodiment of the present invention. Linear lighting apparatus 100 may be used as a low voltage linear floodlight luminaire. Apparatus 100 may be used in both indoor and outdoor applications. In addition, apparatus 100 may be customizable in length. For example, based on at least the selected lengths of some of the various components of apparatus 100, the length of apparatus 100 may be any incremental length between 6" and 96", for example. However, other lengths are possible and within the scope of the present invention.

Apparatus 100 is capable of and configured to refract light produced from a plurality of LEDs in such a way as to produce a linear beam of light. In other words, LEDs normally produce singular points of light. However, apparatus 100 refracts the light produced by the LEDs so that apparatus 100 produces a continuous linear beam of light emanating along a length of apparatus 100. Such a beam of light is useful, for example, in building grazing applications or wall washing lighting effects.

Apparatus 100 includes a housing 110, a printed circuit board ("PCB") strip 120, a primary optical assembly 130, a secondary optical assembly 140, two gasket endcaps 150, an endcap power assembly 160, and an end plate 170.

In another embodiment of the present invention, a single optical assembly replaces primary and secondary optical assemblies 130, 140. In other words, apparatus 100 includes a singular optical assembly rather than two optical assemblies. All of the descriptions of primary and secondary optical assemblies 130, 140 apply to the single optical assembly. In operation, a single optical assembly functions in a manner similar to primary and secondary optical assemblies 130, 140. A single optical assembly may be desired over dual optical assemblies in applications where a larger or asymmetric beam spread is desired from apparatus 100. For example, a single optical assembly may be employed in apparatus 100 when a beam spread greater than 10° is desired.

Housing 110 may comprise any rigid material capable of securely holding PCB strip 120 and primary and secondary optical assemblies 130, 140. For example, housing 110 may be comprised of extruded, anodized aluminum. Housing 110 may also act as a heat sink. For example, heat produced by LEDs 125 may be dissipated by housing 110 into the atmosphere surrounding apparatus 100. Housing 110 may include ribs (not shown) so as to increase the outer surface area of housing 110, thereby increasing the thermal transfer properties of housing 110, for example.

Housing 110 may also be designed to provide for a small profile for apparatus 100. For example, housing 110 may be designed so that a cross-section of apparatus 100 is approximately 1 square inch. Such a small profile allows for using apparatus 100 in locations with small openings or tight architectural details.

PCB strip 120 includes a plurality of LEDs 125 mounted on it. PCB strip 120 may be any commercially available PCB. In another embodiment of the present invention, PCB strip 120 comprises a flexible tape with LEDs 125 surface mounted on the tape.

Primary and secondary optical assemblies 130, 140 include refractory materials. For example, primary and secondary optical assemblies 130, 140 may include an extruded refractory material. The type of refractory material may differ in each of primary and secondary optical assemblies 130, 140. In other words, primary optical assembly 130 may comprise a different extruded refractory material than secondary optical assembly 140. However, one or both of primary and secondary optical assemblies 130, 140 may include the same refractory material.

An exemplary material for either one or both of optical assemblies 130, 140 may be an acrylic material. Acrylic materials are suitable for optical assemblies 130, 140 due to their excellent light transmission and UV light stability properties. For example, acrylic materials may have light transmission efficiencies on the order of 75 to 83%. An example of a suitable refractory material for the optical assemblies 130, 140 is Acylite S10 or polymethyl methacrylate, produced by Cryo Industries. However, any refractory material with increased light transmission efficiencies and/or UV light stability properties may be used for primary and secondary optical assemblies 130, 140 in accordance with the present invention.

Figure 2:
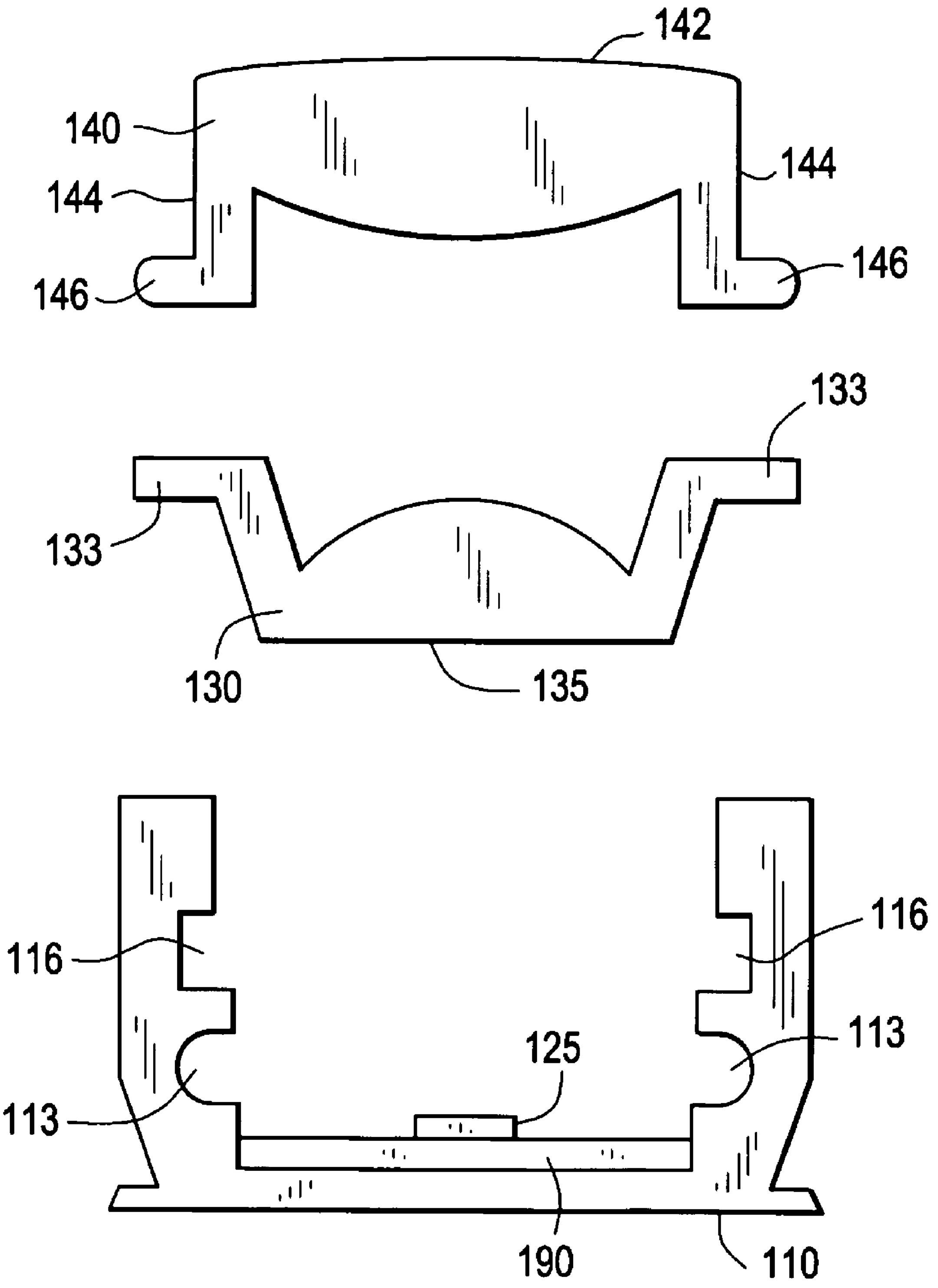
FIG. 2 illustrates a cross-sectional view of the primary and secondary optical assemblies and the housing in accordance with an embodiment of the present invention.
Figure 5:
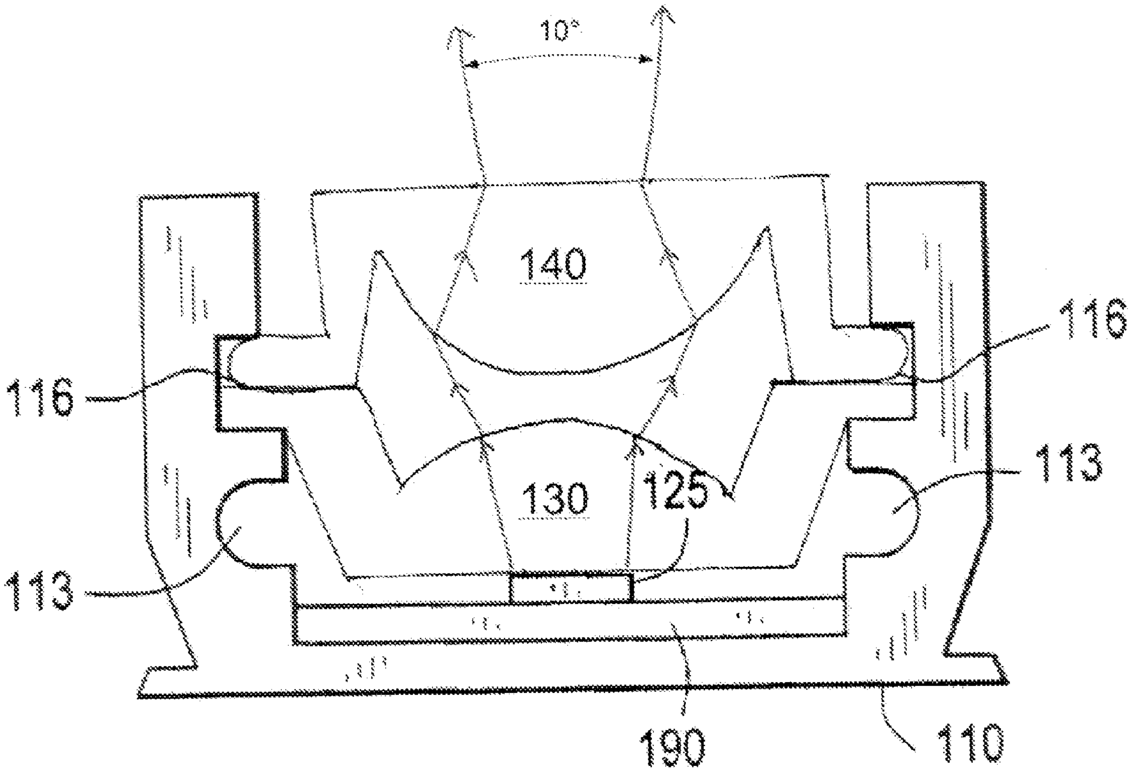
FIG. 5 illustrates a cross-sectional view of the primary and secondary assemblies and the housing shown in FIG. 2, in an assembled state, showing a 10 degree beam spread, in accordance with an embodiment of the present invention.

FIGS. 2 and 5 illustrate a cross-sectional view of primary and secondary optical assemblies 130, 140 and housing 110 in accordance with an embodiment of the present invention. Housing 110 includes a first pair of recesses 113 and a second pair of recesses 116. One or more of the first and second pair of recesses 113, 116 may extend along an entire length or a portion of the length of housing 110.

Each of optical assemblies 130, 140 includes tabs 133, 146 extending along either side of each optical assembly 130, 140. The tabs 133, 146 may extend along an entire length or portion of the length of an optical assembly 130, 140. The tabs 133, 146 may be an integral part of optical assemblies 130, 140. In other words, tabs 133, 146 may be formed when optical assemblies 130, 140 are formed by an extrusion process.

PCB strip 120 is placed along a bottom of housing 110. In another embodiment of the present invention, a foam layer 190 may be placed between PCB strip 120 and housing 110. Foam layer 190 may include an adhesive backing on one or more sides to securely fasten PCB strip 120 to housing 110. Foam layer 190 may be used to relieve pressure exerted on LEDs 125 by primary optical assembly 130, for example.

Primary optical assembly 130 is placed inside housing 110 so as to contact LEDs 125. Primary optical assembly 130 may be held in place inside housing 110 and in contact with LEDs 125 by a mechanical, "snap-fit" connection between the tabs 133 of primary optical assembly 130 and the first pair of recesses 113 (not shown) or the second pair of recesses 116 (FIGS. 2 & 5) in housing 110. For example, primary optical assembly 130 may be slightly bent by exerting physical pressure along a lateral axis (or perpendicular to a longitudinal axis) of primary optical assembly 130. This pressure may cause a lateral size of primary optical assembly to decrease in size, thereby allowing tabs 133 to fit inside housing 110 recesses 113 or 116. In other words, the pressure can "squeeze" primary optical assembly 130 thereby allowing it to fit in housing 110. Once the pressure is removed from primary optical assembly 130, the elasticity of optical assembly 130 may cause tabs 133, 146 to exert outward pressure on walls of housing 110 and recess 113 or 116. The force exerted by primary optical assembly 130 outwards towards recess 113 or 116 and the outer walls of housing 110 causes a "snap-fit" connection between primary optical assembly 130 and housing 110.

Primary optical assembly 130 is placed and held in housing 110 so as to physically contact LEDs 125. For example, a light-receiving surface 135 of primary optical assembly 130 contacts a light-emitting surface of LEDs 125. While the snap-fit connection between primary optical assembly 130 and housing 110 and the direct physical connection between primary optical assembly 130 and LEDs 125 may exert pressure on LEDs 125, foam layer 190 may be used to relieve some or all of this pressure, as described above.

Figure 4:
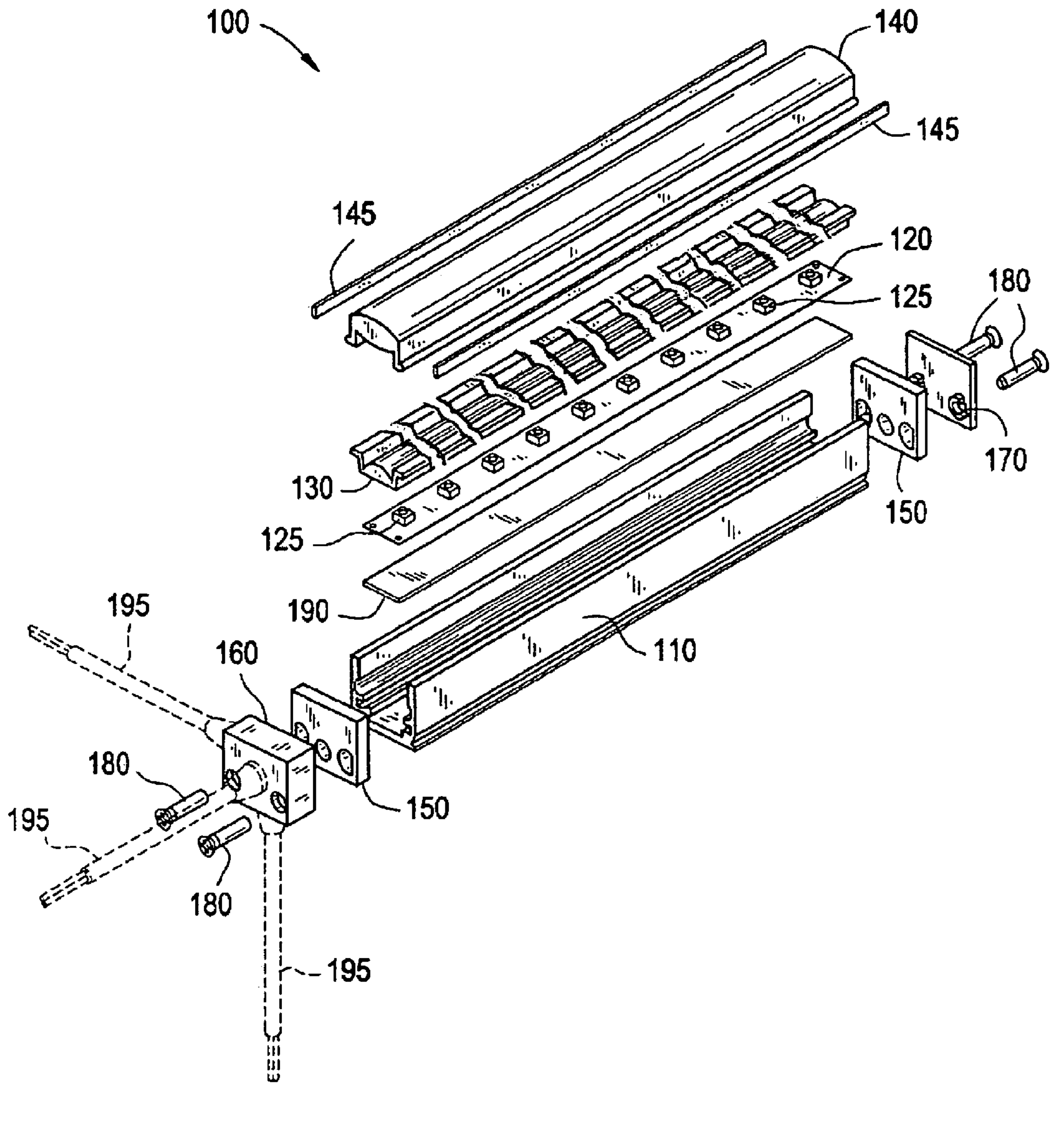
FIG. 4 illustrates an exploded perspective view of a linear lighting apparatus in accordance with another embodiment of the present invention.

In another embodiment of the present invention, primary optical assembly 130 may include a plurality of primary optical assemblies 130 each associated with an LED 125, as shown in FIG. 4. For example, each primary optical assembly 130 of the plurality of primary optical assemblies 130 may be small enough to refract the light from an associated LED 125. In such an embodiment, each primary optical assembly 130 is an integral part of each LED 125. For example, an LED 125 may itself comprise a primary optical assembly 130 as part of the LED 125. In other words, a primary optical assembly 130 is not mounted or attached to an LED 125 but instead forms a part of the whole LED 125.

Secondary optical assembly 140 is placed inside housing 110 in a manner similar to primary optical assembly 130. Secondary optical assembly 140 may be held in place inside housing 110 by a mechanical, "snap-fit" connection between the tabs 146 of secondary optical assembly 140 and either the first or second pair of recesses 113, 116 in housing 110. For example, secondary optical assembly 140 may be slightly bent so as to insert tabs 146 inside housing 110 recesses 113 or 116, similar to primary optical assembly 130, as described above. The force exerted by secondary optical assembly 140 outwards towards the outer walls of housing 110 can cause a "snap-fit" connection between secondary optical assembly 140 and housing 110. Once secondary optical assembly 140 is placed in housing 110, a surface 142 of secondary optical assembly 140 acts as a light-emanating surface of housing 110.

The tabs 146 of secondary optical assembly 140 may be placed into the first pair of housing 110 recesses 113 so as to provide a direct physical connection between primary and secondary optical assemblies 130, 140.

In another embodiment of the present invention, the tabs 146 of secondary optical assembly 140 may be placed into the second pair of housing 110 recesses 116 so as to provide a physical gap between primary and secondary optical assemblies 130, 140.

In another embodiment of the present invention, housing 110 may include a single pair of recesses 113 or 116 extending along an entire length or portion of a length of housing 110. For example, housing 110 may include only recesses 113 or 116, but not both. In such an embodiment, primary and secondary optical assemblies 130, 140 may both be placed into the single pair of recesses 113 or 116.

In another embodiment of the present invention, housing 110 may include a single pair of recesses 113 or 116 extending along an entire length or portion of a length of housing 110. For example, housing 110 may include only recesses 113 or 116, but not both. In such an embodiment, a single optical assembly may be placed into the single pair of recesses 113 or 116.

In another embodiment of the present invention, apparatus 100 may not employ a mechanical, "snap-fit" connection to secure primary and primary and secondary optical assemblies 130, 140 in housing 110. Instead, one or more of primary and secondary optical assemblies 130, 140 may be designed to fit inside housing 110 with very tight tolerances.

A pair of adhesive strips 145 may be placed between outer edges 144 of secondary optical assembly 140 (as shown in FIG. 2) and housing 110. Adhesive strips 145 may be used to prevent foreign matter from reaching the interior volume of housing 110. For example, adhesive strips 145 may be used to prevent water and other environmental materials from reaching the interior of housing 110, thus making assembly 100 suitable for outdoor applications.

Gasket endcaps 150 may be placed on one or more ends of assembly 100. Gasket endcaps 150 may be used to protect the interior volume of housing 110 from foreign matters, similar to adhesive strips 145 as described above.

Endplate 170 may be placed on one or more ends of assembly 100 so as to cover one or more gasket endcaps 150. Endplate 170 may be used to provide a more physically attractive apparatus 100.

Endcap power assembly 160 may be placed on gasket endcap 150 on one or more ends of housing 110. Power assembly 160 may be used to receive power from an external source (such as a wire 195 receiving power from a standard electrical outlet) and to provide power to LEDs 125. One or more screws 180 may be used to attach any one or more of endcaps 150, power assembly 160 and endplate 170 to housing.

In operation, primary and secondary optical assemblies 130, 140 act together to refract light emanating from a plurality of single point light sources (the LEDs 125) and thereby increase the light-transmission efficiency of assembly 100. As an LED 125 produces light, the light enters primary optical assembly 130. Primary optical assembly 130 harnesses the light, or luminous flux, emitted from an LED 125 and refracts the light so as to direct the light into secondary optical assembly 140. For example, primary optical assembly 130 may collimate light emitted from LEDs 125. Primary optical assembly 130 may allow for total internal reflection of the light entering assembly 130, for example.

Figure 6:
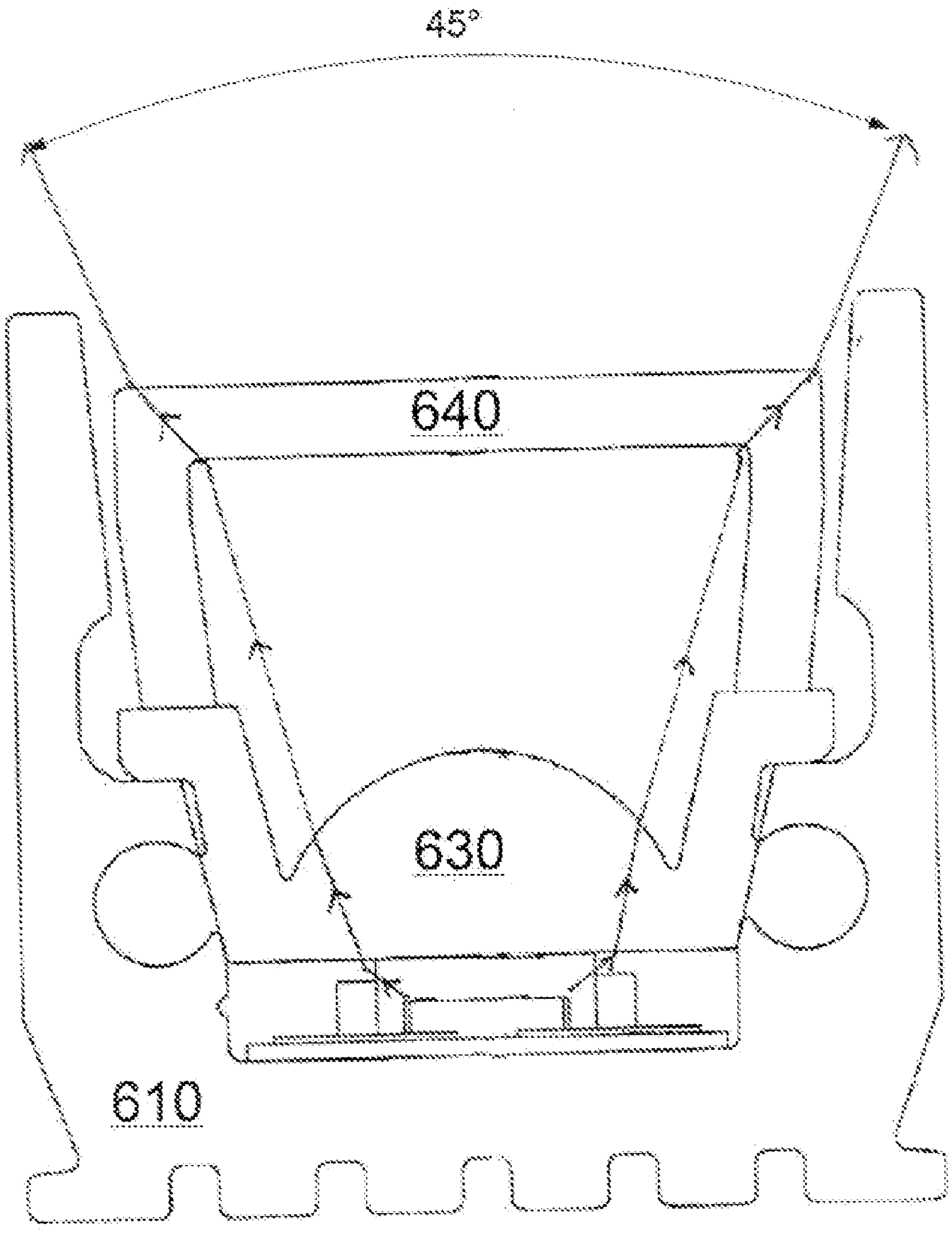
FIG. 6 illustrates a cross-sectional view of primary and secondary assemblies and a housing, showing a 45 degree beam spread, in accordance with an embodiment of the present invention.
Figure 7:
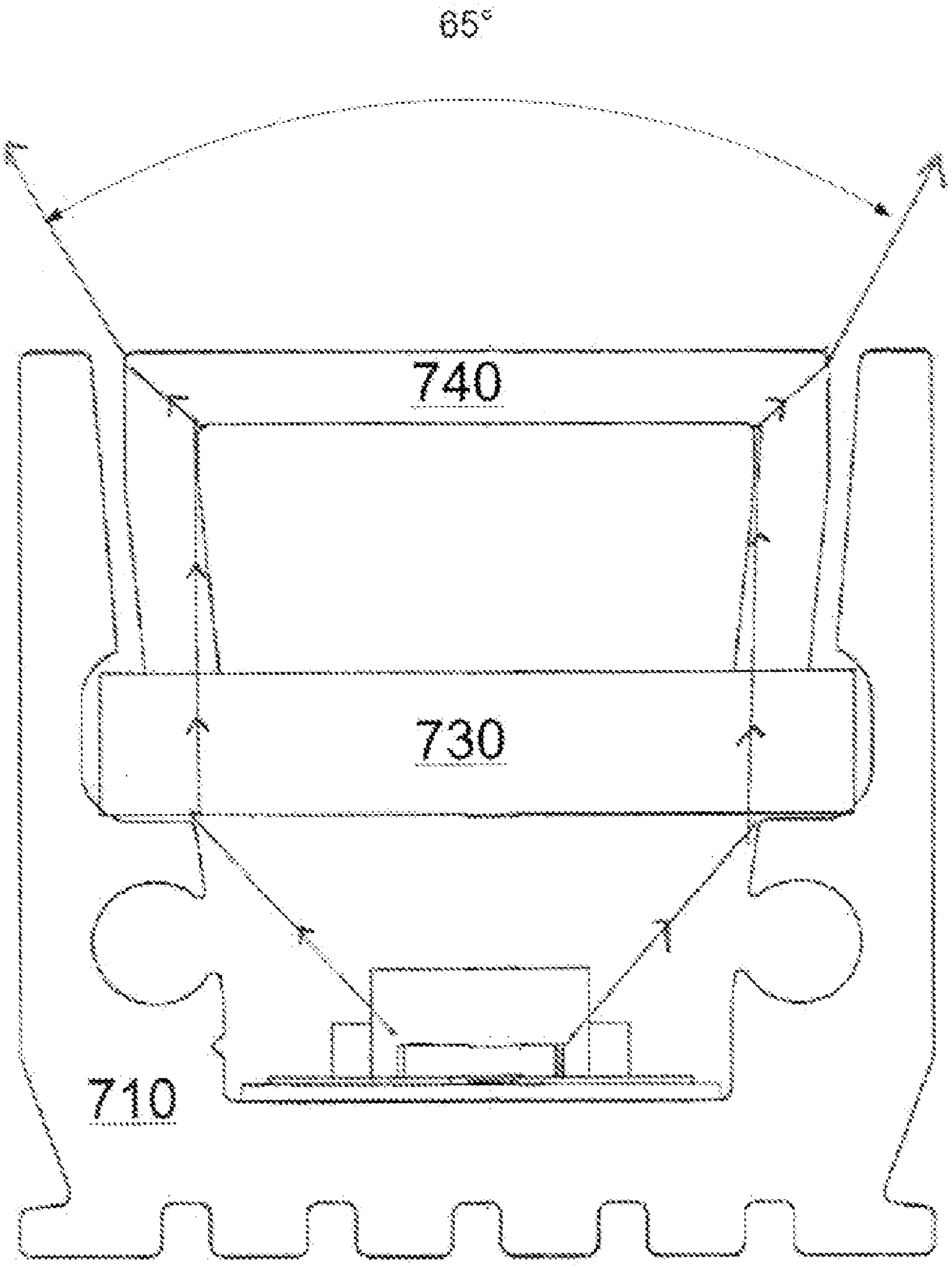
FIG. 7 illustrates a cross-sectional view of primary and secondary assemblies and a housing, showing a 65 degree beam spread, in accordance with an embodiment of the present invention.

Once light produced by LEDs 125 has been received by primary optical assembly 130 and refracted towards secondary optical assembly 140, assembly 140 receives the light. Secondary optical assembly 140 then refracts the light again to direct the light in a desired direction. For example, secondary optical assembly 140 may be customized to direct light in a 5°, 10°, 45° or 65° beam pattern, or spread. For instance. FIG. 5 is an assembled view of the primary and secondary assemblies 130, 140 and the housing 110 shown in FIG. 2, in an assembled state, showing a 10° beam spread. FIG. 6 illustrates a primary optical assembly 630 and a secondary optical assembly 640 disposed in a housing 610, and showing a 45° beam spread. FIG. 7 illustrates a primary optical assembly 730 and a secondary optical assembly 740 disposed in a housing 710, and showing a 65° beam spread. However, additional beam patterns are within the scope of the present invention. The listed beam patterns are provided merely as examples.

One or more of primary and secondary optical assemblies 130, 140 may also provide for inter-reflectance of light emitted by LEDs 125 within one or more of assemblies 130, 140 so as to mix colors of light emitted by various LEDs 125. For example, optical assemblies 130, 140 may be used to mix different colored light emitted by two or more LEDs 125 or to mix similarly colored light emitted by two or more LEDs 125 to provide a more uniform light emitted by surface 142 of second optical assembly 140.

In addition, one or more of primary and secondary optical assemblies 130, 140 may operate alone or together to refract light emitted from the LEDs 125 into a continuous light beam. For example, each LED 125 may provide a single point of light. One or more of optical assemblies 130, 140 may refract light from one or more LEDs 125 so as to cause light emitted by surface 142 of second optical assembly 140 to be continuous and approximately uniform as it emanates from surface 142 along a length of apparatus 100.

The combination of primary and secondary optical assemblies 130, 140 provides for a very efficient linear lighting apparatus 100. As described above, primary optical assembly 130 harnesses light emitted by LEDs 125 so that the amount of light entering second optical assembly 140 is maximized. Secondary optical assembly 140 may then be used to direct, diffuse or refract light in any one of a number of customizable and desired ways. In this way, primary and secondary optical assemblies 130, 140 act in series to refract light from LEDs 125 out of surface 142 of secondary optical assembly 140.

In another embodiment of the present invention, a single optical assembly may be used in place of primary and secondary optical assemblies 130, 140, as described above. In such an embodiment, the single optical assembly physically contacts LEDs 125 so as to refract light emanating from LEDs 125 in a highly efficient manner. The single optical assembly may then refract the light from the LED 125 point sources into a continuous beam of light along a longitudinal axis of apparatus 100. In addition, the single optical assembly may deliver a very controlled, directional beam of light along a perpendicular axis of apparatus 100. For example, the single optical assembly may deliver a beam of light along a beam spread pattern of 45° or 65°.

Figure 3:
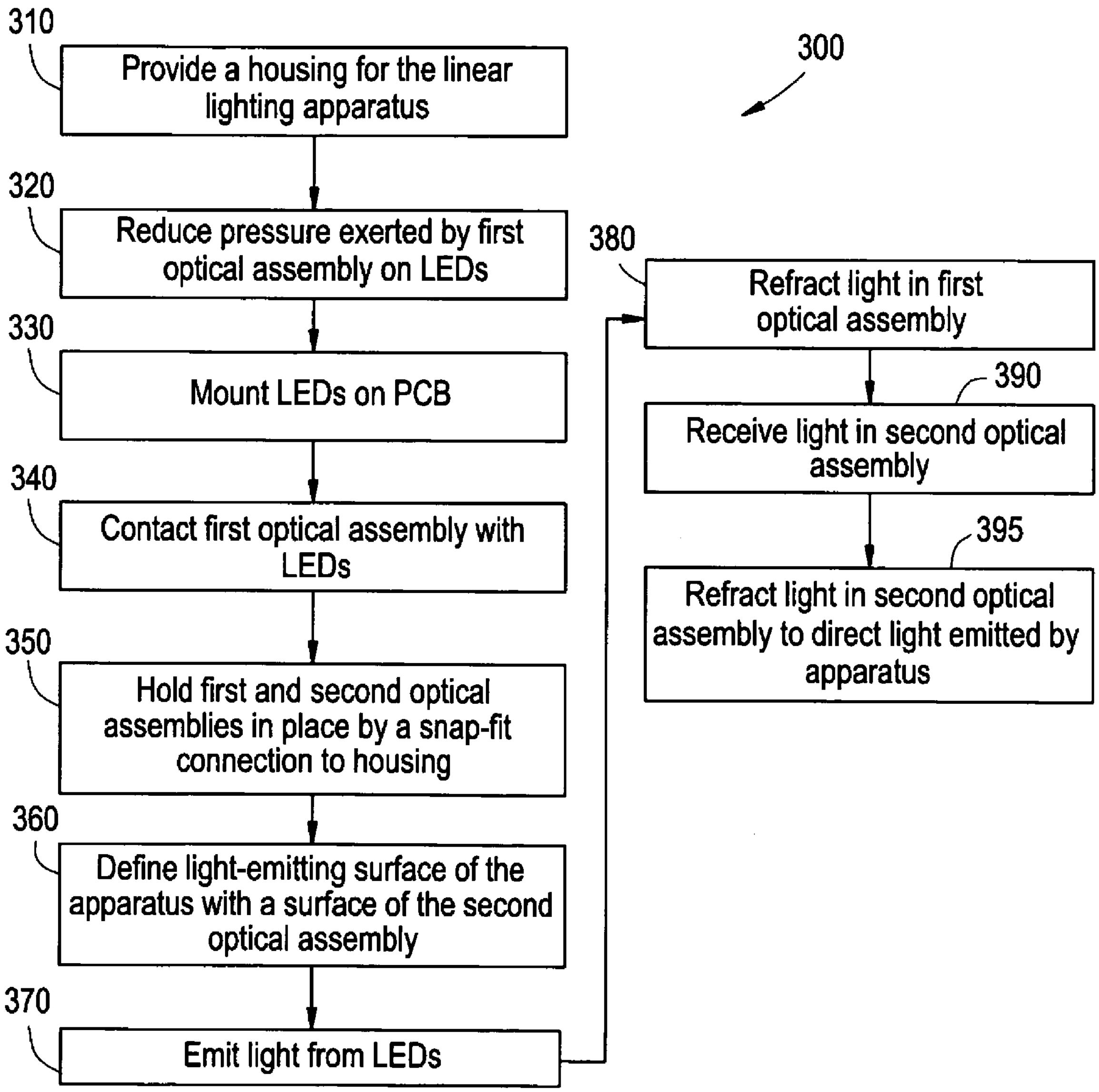
FIG. 3 illustrates a flowchart for a method of improving lighting efficiency from a linear lighting apparatus in accordance with an embodiment of the present invention.

FIG. 3 illustrates a flowchart for a method 300 of improving lighting efficiency from a linear lighting apparatus in accordance with an embodiment of the present invention. First, at step 310, a housing 110 is provided for apparatus 100. As described above, housing 110 may act as a heat sink for apparatus 100.

Next, at step 320, a foam layer 190 may be placed inside housing 110 so as to reduce pressure exerted by first optical assembly 130 on LEDs 125.

Next, at step 330, a plurality of LEDs 125 is mounted on a PCB 120. PCB 120 and LEDs 125 are placed into an interior volume of housing 110. PCB 120 may be placed on foam layer 190 so that layer 190 is disposed between PCB 120 and housing 110.

Next, at step 340, a first optical assembly 130 is placed inside housing 110 so as to physically contact LEDs 125.

Next, at step 350, first and second optical assemblies 130, 140 are secured within housing 110 through a snap-fit connection, as described above.

In another embodiment of the present invention, at step 350, a single optical assembly is secured within housing 110 through a snap-fit connection, as described above.

Next, at step 360, a light-emitting surface of apparatus 100 is defined by a surface 142 of second optical assembly 140. Light refracted and directed by second optical assembly 140 is emitted through surface 142. In an embodiment where a single optical assembly is employed, the light-emitting surface of apparatus 100 is defined by a surface of the single optical assembly.

Next, at step 370, LEDs 125 produce light towards first optical assembly 130. As described above, LEDs 125 may all produce the same or different colored light.

Next, at step 380, first optical assembly 130 refracts light emitted by LEDs 125. As described above, first optical assembly 130 harnesses or collimates the LED 125 light so as to increase the light-transmission efficiency of apparatus 100. In other words, first optical assembly 130 refracts or collimates as much LED 125 light as possible so as to direct as much light as possible towards second optical assembly 140.

Next, at step 390, second optical assembly 140 receives light refracted by first optical assembly 130. As described above, in another embodiment of the present invention, a single optical assembly may be employed in place of two optical assemblies. In such an embodiment, method 300 skips step 390 and proceeds from step 380 to step 395.

Next, at step 395, second optical assembly 140 refracts light received in step 390. As described above, second optical assembly 140 may refract light so as to direct light emitted at surface 142 in a desired direction.

Thus, the apparatus and method described above provide for a linear lighting apparatus with improved light-transmission efficiency. While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features that come within the spirit and scope of the invention.

What is claimed is:

1. A linear lighting apparatus including:

a plurality of light emitting diodes ("LEDs") positioned along a longitudinal axis of said apparatus and configured to emit light, each said LED in contact with a primary optic along a light emitting portion of the LED, the primary optic configured to refract said light;

a secondary optic configured to receive said light refracted by said primary optics and to refract said light outward from said apparatus as a substantially continuous beam of light along said longitudinal axis, and control a beam spread of said light along a perpendicular axis of said apparatus; and an apparatus housing defining an interior volume of said apparatus; wherein said plurality of LEDs and said primary optic are located in said housing and a surface of said secondary optic defines a light-emitting surface of said housing, wherein each of said primary and secondary optics include a plurality of tabs extending along a length of each of said primary and secondary optics and said housing includes a plurality of recesses extending along a length of said housing to receive said primary optic tabs and said secondary optic tabs, and wherein said recesses are disposed to hold said primary and secondary optics and to hold said plurality of LEDs, wherein said recesses hold said primary and secondary optics through snap-fit connections between the primary and secondary optics and said housing.

2. The apparatus of claim 1, further including an apparatus housing, wherein said plurality of LEDs and said primary optics are located in said housing and a surface of said secondary optic defines a light-emitting surface of said housing.

3. The apparatus of claim 2, further including:

a printed circuit board ("PCB") with said plurality of LEDs mounted thereon; and a layer disposed between said flexible PCB and said housing, said layer configured to absorb pressure exerted on said LEDs.

4. The apparatus of claim 2, wherein said secondary optic includes a plurality of tabs extending along a length of said secondary optic and said housing includes a plurality of recesses extending along a length of said housing, wherein said recesses are disposed to hold said secondary optic.

5. The apparatus of claim 2, wherein the housing is rigid.

6. The apparatus of claim 1, wherein each of said primary optics is an integral part of one of said LEDs.

7. The apparatus of claim 1, wherein said secondary optic physically contacts each of said plurality of primary optics.

8. The apparatus of claim 1, wherein said primary and secondary optics are constructed from at least one material, wherein the at least one material comprises an extruded acrylic material.

9. The apparatus of claim 1, wherein said primary optic collimates said light.

10. A method for improving lighting efficiency from a linear lighting apparatus, said method including:

emitting light from a plurality of light emitting diodes ("LEDs");

refracting said light in a plurality of primary optics, each of said primary optics in contact with one of said LEDs along a light emitting portion of the LED;

receiving said light refracted by said primary optics; and refracting said light in a secondary optic so as to direct said light along a perpendicular axis of a longitudinal axis of said apparatus, wherein said light is directed substantially in a beam pattern selected from the group consisting of 5, 10, 45, and 65 degree beam spreads, wherein said plurality of LEDs and said primary optics are located in an apparatus housing defining an interior volume of said apparatus and a surface of said secondary optic defines a light-emitting surface of said housing, wherein each of said primary and secondary optics include a plurality of tabs extending along a length of each of said primary and secondary optics and said housing includes a plurality of recesses extending along a length of said housing to receive said primary optic tabs and said secondary optic tabs, and wherein said recesses are disposed to hold said primary and secondary optics and to hold said primary optics in contact with said plurality of LEDs, wherein said recesses hold said primary and secondary optics through snap-fit connections; connection between said primary and secondary optics and said housing.

11. The method of claim 10, further including:

providing a housing of said apparatus, wherein said LEDs and said primary optics are located in said housing; and defining a light-emitting surface of said housing with said secondary optic.

12. The method of claim 11, further including:

mounting said LEDs on a printed circuit board ("PCB"); and reducing pressure exerted on said LEDs in a layer between said PCB and said housing.

13. The method of claim 11, wherein said secondary optic includes a plurality of tabs extending along a length of said secondary optic and said housing includes a plurality of recesses extending along a length of said housing, wherein said recesses are disposed to hold said secondary optic.

14. The method of claim 10, wherein each of said primary optics is an integral part of one of said LEDs.

15. The method of claim 10, further including physically contacting said secondary optic with each of said primary optics.

16. The method of claim 10, wherein said primary and secondary optics each include an extruded acrylic material.

17. A lighting apparatus providing for increased lighting efficiency, said apparatus including:

a plurality of light emitting diodes ("LEDs") positioned along a longitudinal axis of said apparatus;

a plurality of first light-refractors refracting light emitted by the LED wherein each LED is in contact with one of the plurality of first light-refractors along a light emitting portion of the LED; and a second light-refractor configured to receive said light refracted by said first light-refractors and to refract said light outward from a perpendicular axis of said apparatus in a substantially controlled beam spread; and an apparatus housing defining an interior volume of said apparatus; wherein said plurality of LEDs and said first light-refractors are located in said housing and a surface of said second light-refractor defines a light-emitting surface of said housing, wherein each of said first and second light-refractors include a plurality of tabs extending along a length of each of said first and second light-refractors and said housing includes a plurality of recesses extending along a length of said housing to receive said first light-refractor tabs and said second light-refractor tabs, and wherein said recesses are disposed to hold said first and second light-refractors and to hold said first light-refractors in contact with said plurality of LEDs, wherein said recesses hold said first and second light-refractors through snap-fit connections; between said first and second light-refractors and said housing.

18. The apparatus of claim 17, wherein said second light-refractor physically contacts at least one of said first light-refractors included in said LEDs.

19. The apparatus of claim 17, wherein each of the plurality of first light-refractors exerts pressure on its associated LED.

20. The apparatus of claim 17, further comprising a substantially rigid housing.

21. A linear lighting apparatus including:

a plurality of light emitting diodes ("LEDs") positioned along a longitudinal axis of said apparatus and configured to emit light, each said LED in contact with a primary optic along a light emitting portion of the LED, the primary optic configured to refract said light;

a secondary optic configured to receive said light refracted by said primary optics and to refract said light outward from a perpendicular axis of said apparatus substantially in a beam pattern selected from the group consisting of 5, 10, 45, and 65 degree beam spreads; and an apparatus housing defining an interior volume of said apparatus; wherein said plurality of LEDs and said primary optic are located in said housing and a surface of said secondary optic defines a light-emitting surface of said housing, wherein each of said primary and secondary optics include a plurality of tabs extending along a length of each of said primary and secondary optics and said housing includes a plurality of recesses extending along a length of said housing to receive said primary optic tabs and said secondary optic tabs, and wherein said recesses are disposed to hold said primary and secondary optics and to hold said primary optic in contact with said plurality of LEDs, wherein said recesses hold said primary and secondary optics through snap-fit connections between said primary and secondary optics and said housing.

22. The apparatus of claim 21, further including an apparatus housing, wherein said plurality of LEDs and said primary optics are located in said housing and a surface of said secondary optic defines a light-emitting surface of said housing.

23. The apparatus of claim 22, further including:

a printed circuit board ("PCB") with said plurality of LEDs mounted thereon; and a layer disposed between said flexible PCB and said housing, said layer configured to absorb pressure exerted on said LEDs.

24. The apparatus of claim 22, wherein said secondary optic includes a plurality of tabs extending along a length of said secondary optic and said housing includes a plurality of recesses extending along a length of said housing, wherein said recesses are disposed to hold said secondary optic.

25. The apparatus of claim 21, wherein each of said primary optics is an integral part of one of said LEDs.

26. The apparatus of claim 21, wherein said secondary optic physically contacts each of said plurality of primary optics.

27. The apparatus of claim 21, wherein said primary and secondary optics are constructed from at least one material, wherein the at least one material comprises an extruded acrylic material.

* * * * *

UNITED STATES PATENT AND TRADEMARK OFFICE

CERTIFICATE OF CORRECTION

PATENT NO. : 7,857,482 B2
APPLICATION NO. : 11/605576
DATED : December 28, 2010
INVENTOR(S) : Ann Reo et al.

It is certified that error appears in the above-identified patent and that said Letters Patent is hereby corrected as shown below:

Claim 1, column 9, line 13, "ondary optics and to hold said plurality of LEDs" should be changed to -- ondary optics and to hold said primary optic in contact with said plurality of LEDs --.

Signed and Sealed this
Twenty-sixth Day of April, 2011

David J. Kappos
*Director of the United States Patent and Trademark Office*